(12) United States Patent
Austin (10) Patent No.: US 12,427,920 B1
(45) Date of Patent: Sep. 30, 2025

(54) SEMI-TRUCK SIDE-VIEW MIRROR WITH INTEGRAL CAMERA

(71) Applicant: Keshon Austin, Henrico, VA (US)

(72) Inventor: Keshon Austin, Henrico, VA (US)

(*) Notice: Subject to any disclaimer, the term of this patent is extended or adjusted under 35 U.S.C. 154(b) by 914 days.

(21) Appl. No.: 17/589,956

(22) Filed: Feb. 1, 2022

(51) Int. Cl.
*B60R 1/12* (2006.01)
*B60R 1/06* (2006.01)
*B60R 1/072* (2006.01)
*B60R 11/00* (2006.01)
*B60R 11/04* (2006.01)
*H04N 23/51* (2023.01)

(52) U.S. Cl.
CPC .............. *B60R 1/12* (2013.01); *B60R 1/0607* (2013.01); *B60R 1/072* (2013.01); *B60R 11/04* (2013.01); *H04N 23/51* (2023.01); *B60R 2001/1215* (2013.01); *B60R 2001/1253* (2013.01); *B60R 2011/004* (2013.01); *B60R 2300/605* (2013.01); *B60R 2300/802* (2013.01)

(58) Field of Classification Search
CPC .... B60R 1/12; B60R 1/22; B60R 1/26; B60R 2001/1215; B60R 2001/1253; B60R 1/20; B60R 1/23; B60R 1/24; B60R 1/25
See application file for complete search history.

(56) References Cited

U.S. PATENT DOCUMENTS

| | | | |
|---|---|---|---|
| 6,217,177 B1 * | 4/2001 | Rost | B60R 1/025 359/872 |
| 6,954,152 B1 * | 10/2005 | Matthews | B60R 1/25 348/148 |
| 8,199,975 B2 | 6/2012 | Pomerleau | |
| 8,670,035 B2 | 3/2014 | Robert | |
| D821,278 S | 6/2018 | Unveren | |
| 10,086,764 B2 | 10/2018 | Park | |
| 2002/0141086 A1 * | 10/2002 | Lang | B60R 1/28 359/838 |
| 2010/0079883 A1 * | 4/2010 | Englander | B60R 1/1207 359/872 |
| 2017/0374309 A1 * | 12/2017 | Ikedo | H04N 25/78 |
| 2019/0009721 A1 * | 1/2019 | Schofield | B60K 35/00 |
| 2020/0238914 A1 | 7/2020 | Almahmoud | |

FOREIGN PATENT DOCUMENTS

| | | | | |
|---|---|---|---|---|
| CA | 2726186 | | 6/2011 | |
| CN | 106347225 A | * | 1/2017 | |
| DE | 29818214 U1 | * | 2/2000 | B60Q 1/52 |

* cited by examiner

*Primary Examiner* — Ephrem Z Mebrahtu
(74) *Attorney, Agent, or Firm* — Kyle A. Fletcher, Esq.

(57) ABSTRACT

The semi-truck side-view mirror with integral camera comprises a side view mirror, a camera, a rotation mechanism, a mounting arm, and a display screen. The semi-truck side-view mirror with integral camera may be adapted to provide a driver with visibility of a tail end of a trailer during a backing turn. The camera within the side view mirror may present an image on the display screen showing the tail end of the trailer. During the backing turn, the rotation mechanism may rotate the side view mirror about a vertically-oriented axis of rotation to keep the tail end of the trailer within the field of view of the camera.

18 Claims, 6 Drawing Sheets

SEMI-TRUCK SIDE-VIEW MIRROR WITH INTEGRAL CAMERA

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the fields of semi-trucks and side-view mirror systems, more specifically, a semi-truck side-view mirror with integral camera.

SUMMARY OF INVENTION

The semi-truck side-view mirror with integral camera comprises a side view mirror, a camera, a rotation mechanism, a mounting arm, and a display screen. The semi-truck side-view mirror with integral camera may be adapted to provide a driver with visibility of a tail end of a trailer during a backing turn. The camera within the side view mirror may present an image on the display screen showing the tail end of the trailer. During the backing turn, the rotation mechanism may rotate the side view mirror about a vertically-oriented axis of rotation to keep the tail end of the trailer within the field of view of the camera. Without the semi-truck side-view mirror with integral camera, the driver may lose visibility of the tail end as the trailer pivots relative to a truck causing the side view mirror to point towards the side of the trailer. Note that the combination of the truck and with the trailer may be referred to as a semi-truck.

An object of the invention is to provide a side view mirror for a semi-truck.

Another object of the invention is to rotate the side-view mirror about a vertically-oriented axis of rotation during a backing turn to the blind side of the semi-truck such that the tail end of the trailer remains within the field of view of the side-view mirror during the backing turn.

A further object of the invention is to provide a camera integral to the side-view mirror and a display screen such that camera captures, and the display screen shows, an image of the tail end of the trailer during the backing turn.

Yet another object of the invention is to provide embodiments where the display is mounted externally-on the side-view mirror.

These together with additional objects, features and advantages of the semi-truck side-view mirror with integral camera will be readily apparent to those of ordinary skill in the art upon reading the following detailed description of the presently preferred, but nonetheless illustrative, embodiments when taken in conjunction with the accompanying drawings.

In this respect, before explaining the current embodiments of the semi-truck side-view mirror with integral camera in detail, it is to be understood that the semi-truck side-view mirror with integral camera is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the semi-truck side-view mirror with integral camera.

It is therefore important that the claims be regarded as including such equivalent construction insofar as they do not depart from the spirit and scope of the semi-truck side-view mirror with integral camera. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Detailed reference will now be made to a first potential embodiment of the disclosure, which is illustrated in FIGS. 1 through 7.

The semi-truck side-view mirror with integral camera 100 (hereinafter invention) comprises a side view mirror 200, a camera 230, a rotation mechanism 240, a mounting arm 204, and a display screen 250. The invention 100 may be adapted to provide a driver with visibility of a tail end 912 of a trailer 910 during a backing turn. The camera 230 within the side view mirror 200 may present an image on the display screen 250 showing the tail end 912 of the trailer 910. During the backing turn, the rotation mechanism 240 may rotate the side view mirror 200 about a vertically-oriented axis of rotation 290 to keep the tail end 912 of the trailer 910 within the field of view of the camera 230. Without the invention 100, the driver may lose visibility of the tail end 912 as the trailer 910 pivots relative to a truck 900 causing the side view mirror 200 to point towards the side of the trailer 910. Note that the combination of the truck 900 and with the trailer 910 may be referred to as a semi-truck.

The side view mirror 200 may comprise one or more mirror segments 208. The camera 230 may be mounted within the side view mirror 200 behind the one or more mirror segments 208. The camera 230 may have a field of view that is directed towards the tail end 912 of the trailer 910 through the one or more mirror segments 208.

The one or more mirror segments 208 may comprise a camera portal 212 that may provide an optical pathway through the one or more mirror segments 208 for the camera 230 to view the trailer 910. In some embodiments, the camera portal 212 may be a camera aperture. The camera aperture may be an aperture in the one or more mirror segments 208 that is devoid of glass and passes from the front surface of the one or more mirror segments 208 to the rear surface of the one or more mirror segments 208. The camera 230 may view the trailer 910 through the camera aperture.

In some embodiments, the camera portal 212 may be an unsilvered area of the one or more mirror segments 208. The one or more mirror segments 208 may provide clear glass in front of the camera 230 at the camera portal 212. With the metal that causes the one or more mirror segments 208 to reflect light missing at the camera portal 212, the camera 230 may view the trailer 910 through the camera portal 212.

In some embodiments, the camera portal 212 may be a half-silvered area, also known as a one-way mirror. The one or more mirror segments 208 may appear to be reflective over the entirety of the one or more mirror segments 208, including at the camera portal 212, from the front side of the one or more mirror segments 208, however the one or more mirror segments 208 may appear to be transparent from the rear side of the one or more mirror segments 208 at least at the camera portal 212 and, in some embodiments, over the entirety of the one or more mirror segments 208.

In some embodiments, the one or more mirror segments 208 may comprise a first mirror segment 210 and a second mirror segment 220. The first mirror segment 210 and the second mirror segment 220 may be mounted within a side view mirror housing 202. The second mirror segment 220 may be adjacent to the first mirror segment 210. As a non-limiting example, the first mirror segment 210 may be the top mirror of a set of mirrors located within the side view mirror housing 202 and the second mirror segment 220 may be the bottom mirror. In some embodiments, the first mirror segment 210 and the second mirror segment 220 may comprise different degrees of magnification. As a non-limiting example, the first mirror segment 210 may be planar and may provide unity or 1:1 magnification. The second mirror segment 220 may be convex and may provide a wider field of view compared to the first mirror segment 210, albeit with the side-effect of making objects looks farther away than they really are.

The camera 230 may be an optical instrument that captures the image of a scene in front of the camera 230 as binary values stored in memory within the camera 230. An image sensor within the camera 230 may convert the image into the binary values. One or more of the images may be communicated to the display screen 250 as electrical signals such that the display screen 250 may show a representation of objects that the camera 230 is pointed towards. The camera 230 may be directed towards the trailer 910 such that a lens 232 may project the image of the trailer 910 into the camera 230. The camera 230 may be housed within a camera body 234 that may be coupled to the side view mirror housing 202 such that the camera 230 may be positioned behind the one or more mirror segments 208 and the lens 232 may be aligned with the camera portal 212.

The rotation mechanism 240 may pivotably couple the side view mirror 200 to the mounting arm 204. The mounting arm 204 may be coupled to the side of the truck 900. The rotation mechanism 240 may receive a steering signal from a steering sensor 270 within the truck 900 reporting the direction and magnitude that the truck 900 is being steered. As non-limiting examples, the steering sensor 270 may monitor movements of a steering wheel, movements of a front wheel, changes in the angle formed by the trailer 910 relative to the truck 900, or any combination thereof. Responsive to the steering signal, the rotation mechanism 240 may rotate the side view mirror 200 such that the camera 230 remains pointed at the trailer 910 with the tail end 912 of the trailer 910 included in the image shown on the display screen 250.

The rotation mechanism 240 may comprise a motor 242 and a worm drive. The motor 242 may convert electrical energy into mechanical energy. The motor 242 may cause rotational motion of the worm drive when the electrical energy is applied to the motor 242. The electrical energy applied to the motor 242 may be controlled by the steering sensor 270. The motor 242 may be energized by electrical energy having a first polarity to rotate the side view mirror 200 away from the truck 900. The motor 242 may be energized by electrical energy having a second polarity to rotate the side view mirror 200 towards the truck 900. The motor 242 may be coupled to the inside of the side view mirror housing 202.

The worm drive may comprise a worm screw 246 and a worm gear 248. The worm screw 246 may be a threaded cylinder that may be coupled to the motor 242. The worm gear 248 may be a toothed wheel that may be coupled to the mounting arm 204. The teeth on the worm gear 248 may complement the threads on the worm screw 246 such that the worm gear 248 meshes with the worm screw 246. Rotation of the worm screw 246 may rotate the worm gear 248 relative to the worm screw 246. Rotation of the worm screw 246 may cause the worm screw 246 to travel along the worm gear 248 because the worm gear 248 is immovably coupled to the mounting arm 204. The worm screw 246 may push the side view mirror housing 202 and may cause rotation of the side view mirror 200.

In some embodiments, the display screen 250 may be mounted within a cab 902 of the truck 900. As a non-limiting example, the display screen 250 may be mounted on a dashboard.

In some embodiments, the display screen 250 may be mounted on the side view mirror 200. As non-limiting examples, the advantages of mounting the display screen 250 on the side view mirror 200 may be that the display screen 250 may be adapted for the driver to see the display screen 250 and the one or more mirror segments 208 simultaneously while backing, that the display screen 250 turns towards the driver and therefore becomes more viewable as the side view mirror 200 rotates to compensate for the backing turn, or both.

Figure 1:
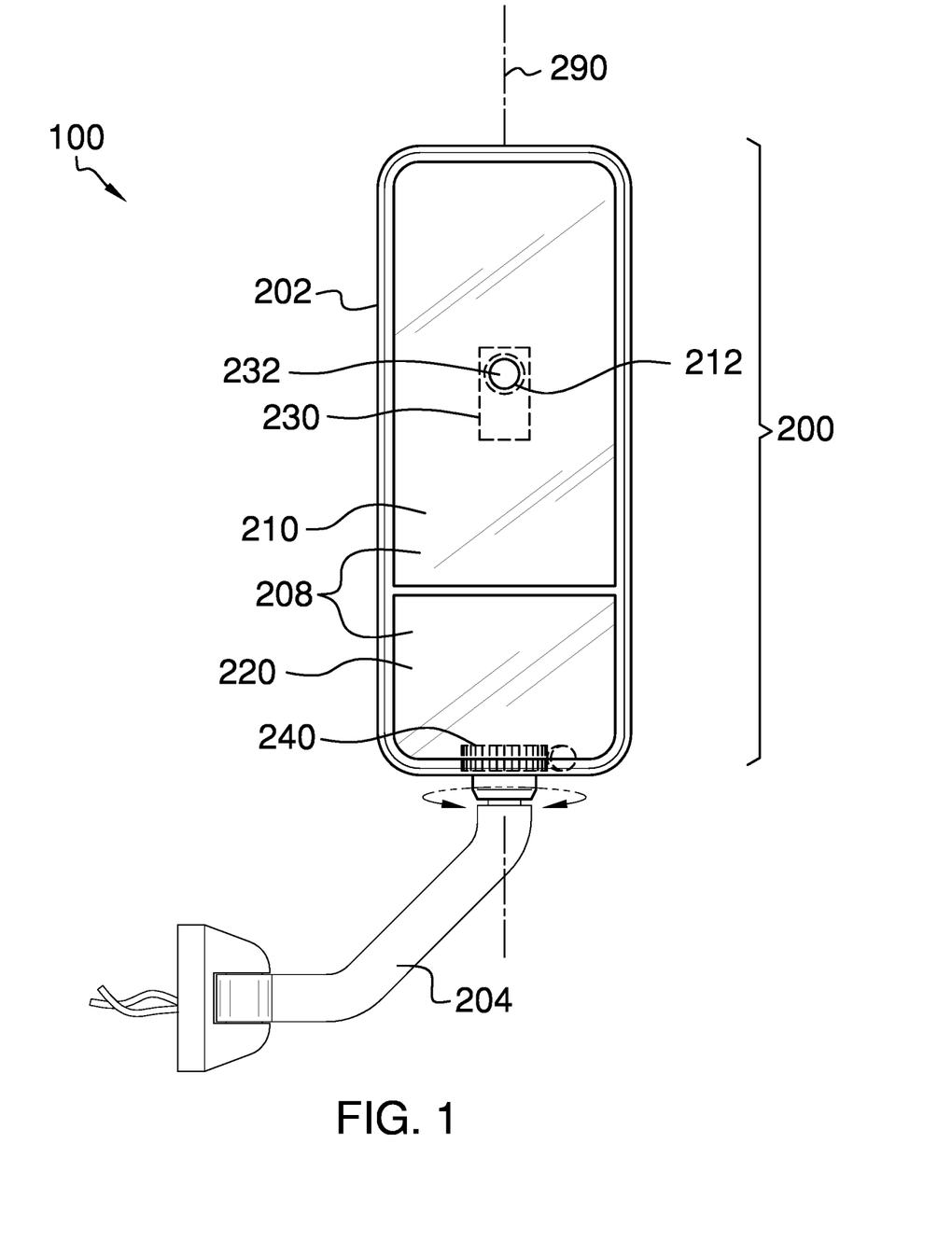
FIG. 1 is a front view of an embodiment of the disclosure.
Figure 2:
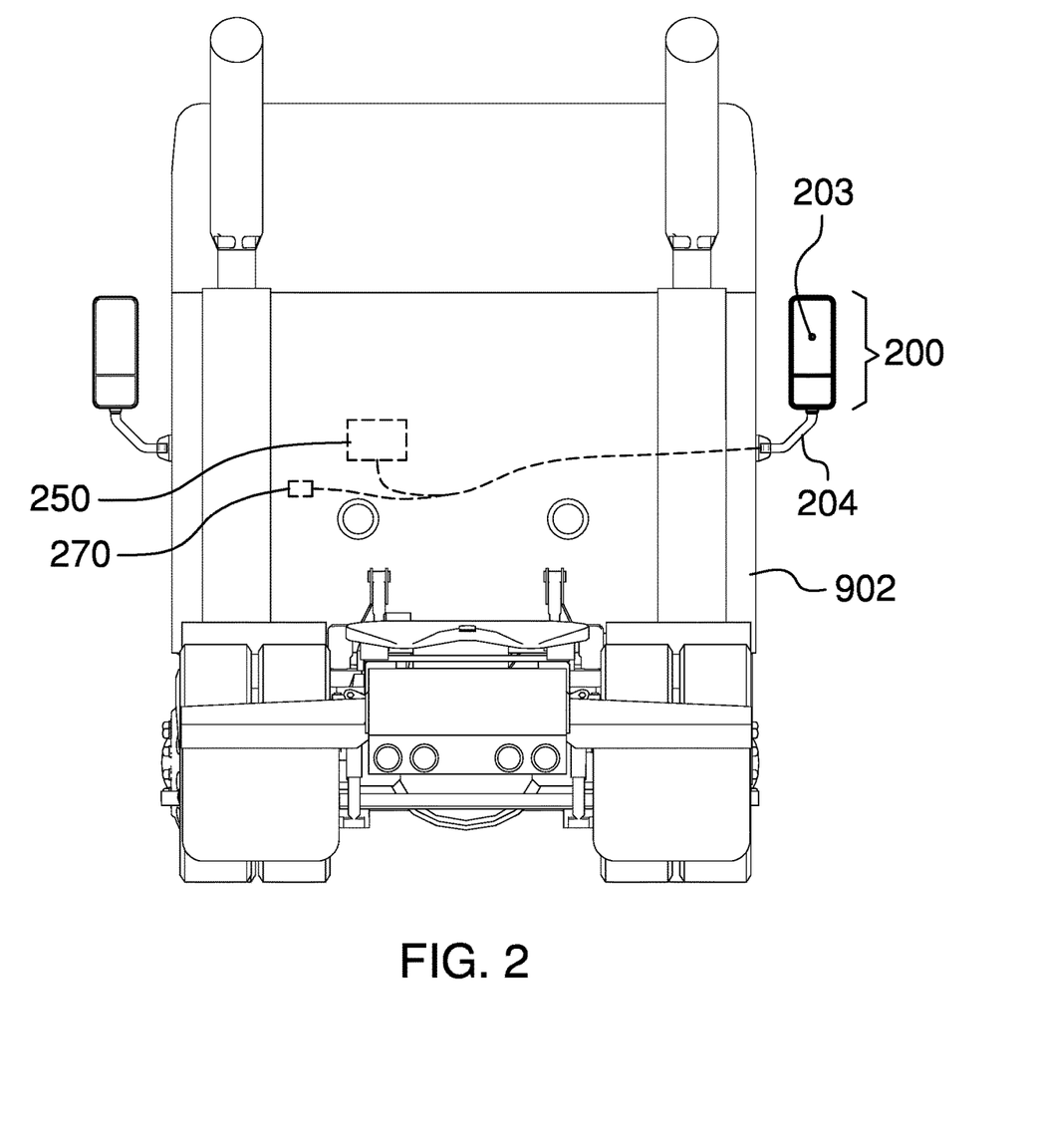
FIG. 2 is an in-use view of an embodiment of the disclosure, illustrating the location of the side-view mirror on the truck.
Figure 3:
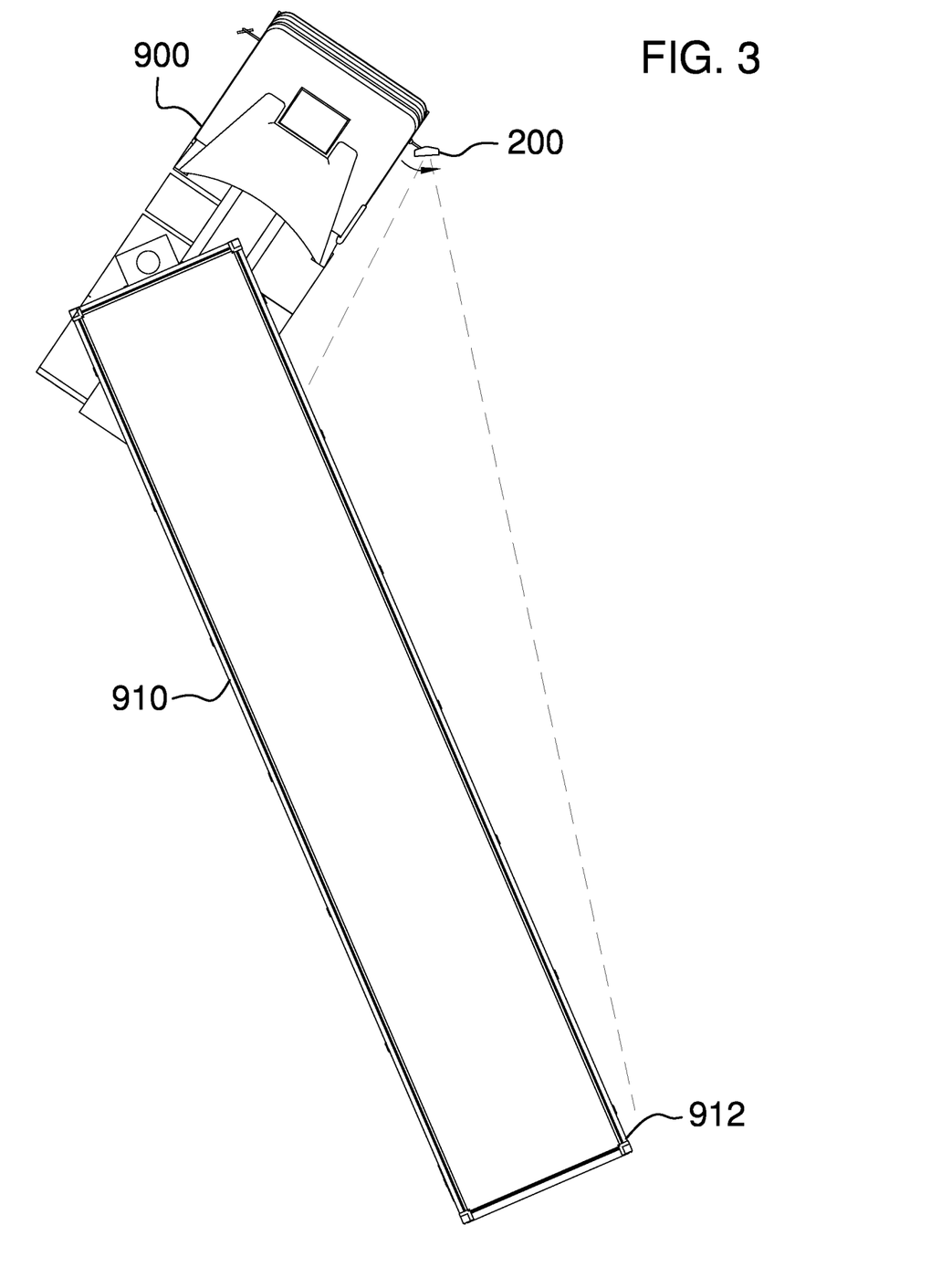
FIG. 3 is an in-use view of an embodiment of the disclosure, illustrating the truck and trailer seen from overhead during a backing turn to the blind side of the semi-truck.
Figure 4:
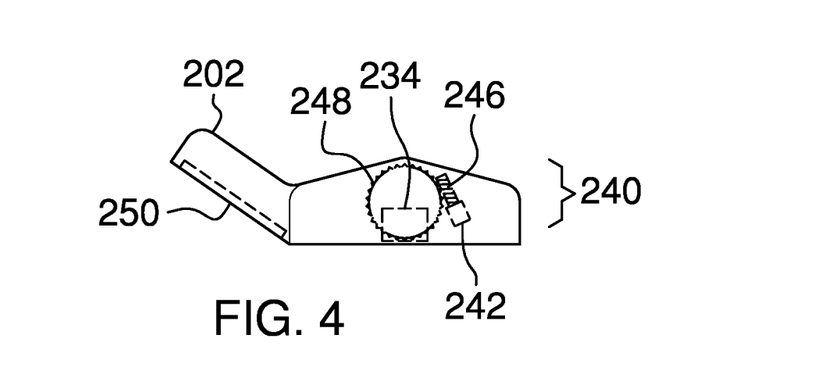
FIG. 4 is a top view of a first alternative embodiment of the disclosure, illustrating the display mounted on a side extension of the side-view mirror.
Figure 5:
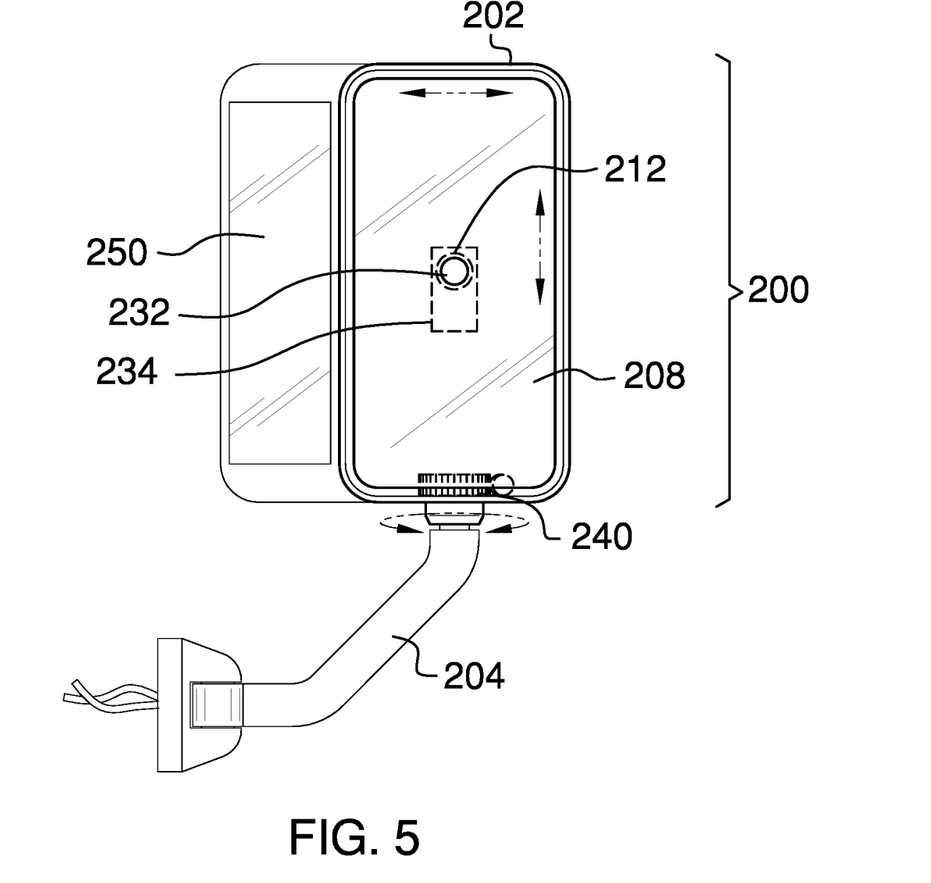
FIG. 5 is a front view of a first alternative embodiment of the disclosure, illustrating the display mounted on a side extension of the side-view mirror.

As a non-limiting example, the display screen 250 may be mounted on a side of the side view mirror 200 between the side view mirror 200 and the truck 900 in a position that is not coplanar with the one or more mirror segments 208 and is angled towards the front of the truck 900.

Figure 6:
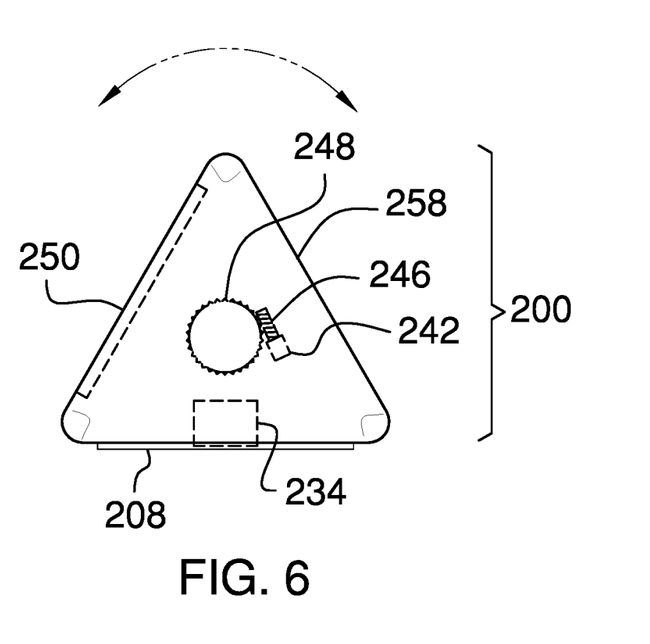
FIG. 6 is a top view of a second alternative embodiment of the disclosure, illustrating the display mounted on a side of a triangular shaped side-view mirror.
Figure 7:
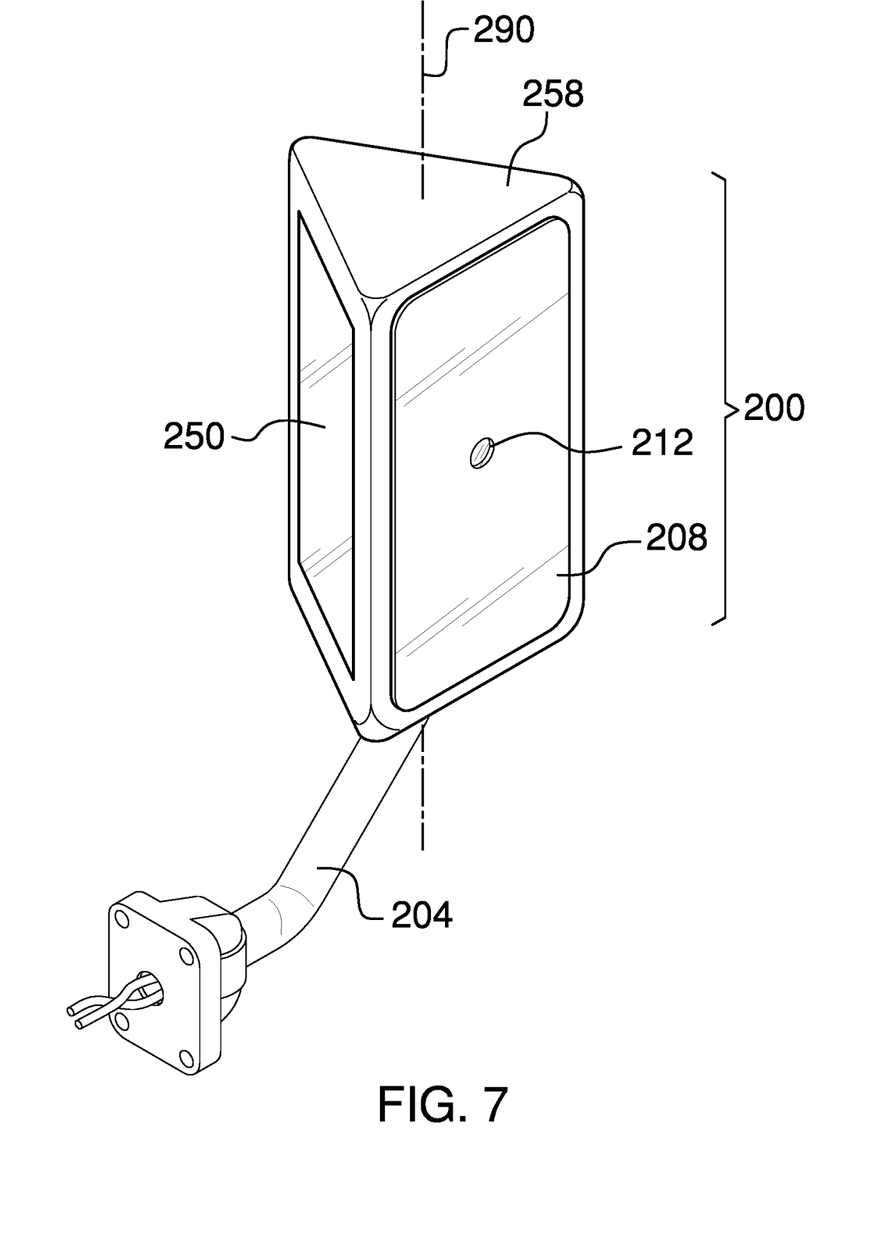
FIG. 7 is an isometric view of a second alternative embodiment of the disclosure, illustrating the display mounted on a side of a triangular shaped side-view mirror.

As a further non-limiting example, the side view mirror housing 202 may be a triangular housing 258 when viewed from above with the one or more mirror segments 208 on a first surface of the triangular housing 258 and the display screen 250 mounted on a second surface of the triangular housing 258 where the second surface is located between the center of the side view mirror 200 and the front of the truck 900.

In some embodiments, the side view mirror 200, the camera 230, the rotation mechanism 240, and the mounting arm 204 may be coupled to a right side of the truck 900. A backing turn to the right side of the truck 900 is traditionally known as "blind side backing". During a backing turn to the left the driver may turn their head to look at the tail end 912 of the trailer 910 through the driver's side window. However, during a backing turn to the right the driver cannot see the tail end 912 of the trailer 910 except in the right sideview mirror and, as the turn progresses, the tail end 912 of the trailer 910 may move out of the field of view of the right sideview mirror. The invention 100 may be operable to keep the tail end 912 of the trailer 910 in view during blind backing using the camera 230, the display screen 250, and rotation of the side view mirror 200 that houses the camera 230.

In use, a driver of a truck 900 and a trailer 910 may look at a side view mirror 200 and/or a display screen 250 during a backing turn to see a tail end 912 of the trailer 910. As the truck 900 turns relative to the trailer 910, the side view mirror 200 may rotate such that the side view mirror 200 remains pointed at the tail end 912 of the trailer 910. The driver may monitor movement of the trailer 910 in a first mirror segment 210, in a second mirror segment 220 which may provide a wider field of view than the first mirror segment 210, on the display screen 250 which may display images captured by a camera 230 located within the side view mirror 200, or any combination thereof.

DEFINITIONS

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" may refer to top and "lower" may refer to the bottom. As a non-limiting example, the upper end of a vertical shaft is the top end of the vertical shaft.

As used in this disclosure, an "aperture" may be an opening in a surface. Aperture may be synonymous with hole, slit, crack, gap, slot, or opening.

As used in this disclosure, a "camera" may be a sensor that converts light into electric signals that encode the spatial orientation of the captured light in a manner that reproduces the images seen by a human eye.

As used herein, "complement" or "complementary" may refer to a compatibility between threaded parts such that the gender, handedness, form, angle, pitch, diameter, and thread depth of both threads are compatible for the parts to mate by screwing the threads together. "Complement" and "complementary" may also be used to describe compatibility between geared parts and/or combinations of geared parts and threaded parts. As a non-limiting example, the worm screw and worm gear of a worm drive mechanism may be said to be complementary if the worm screw meshes with the worm gear and the worm screw is operable to turn the worm gear when the worm screw rotates.

As used in this disclosure, "convex" may be used to describe a surface that resembles the exterior surface of a sphere or a portion thereof.

As used herein, the words "couple", "couples", "coupled" or "coupling", may refer to connecting, either directly or indirectly, and does not necessarily imply a mechanical connection.

As used in this disclosure, a "field of view" may refer to one or more angles that delimit an area from which electromagnetic radiation will be sensed by a person or an image sensor.

As used herein, "front" may indicate the side of an object that is closest to a forward direction of travel under normal use of the object or the side or part of an object that normally presents itself to view or that is normally used first. "Rear" or "back" may refer to the side that is opposite the front.

As used in this disclosure, a "gear" may be a toothed wheel, cylinder, or other toothed mechanical element that is used to transmit motion, a change of speed, or a change of direction to second toothed wheel, cylinder, rack, or other toothed or slotted mechanical element.

As used in this disclosure, a "housing" may be a rigid or semi-rigid casing that encloses and protects one or more devices.

As used in this disclosure, an "image" may be an optical representation or reproduction of an indicia or of the appearance of something or someone.

As used in this disclosure, an "image sensor" may receive light from the exterior of the image sensor and converts the received light into a digital representation of an image. The digital representation of the image may be stored electronically and/or may be transmitted electronically. One or more logic modules may convert the digital representation into signals that may drive an electronic display to reproduce a visual reproduction of the source of the captured light As used in this disclosure, a "lens" may be a transparent substance through which light can pass. A lens may or may not be formed with curved surfaces that are used to concentrate or disperse the light that travels through the lens.

As used in this disclosure, a "mirror" may be a surface that is designed to reflect light with a minimum of dispersion or absorption. In some embodiments, a mirror may be formed with curved surfaces that are used to magnify the reflected image or to enlarge the field of view of the reflected image.

As used in this disclosure, a "motor" may refer to a device that transforms energy from an external power source into mechanical energy.

As used herein, "one-way mirror" (also known as "one-way glass", "semi-transparent mirror", or "half-silvered mirror") may refer to a mirror that appears reflective on one side and transparent on the other side. In general, one-way mirrors appear to be reflective on the side that is brightly lit and appear to be transparent from the side that is dimly lit or dark. The perception of one-way transmission of light may result from a thin layer of metal that passes some light and reflects some light. Light may pass through the metal layer equally in both directions however the darker side may be difficult to see from the brightly lit side because light coming from the darker side is masked by the much brighter reflection on the lit side.

As used in this disclosure, a "trailer" may be an unpowered wheeled vehicle that is towed by a powered vehicle. As used in this disclosure, "transparent" may refer to a material that allows light to pass through the material without significant scattering such that an object can be seen without distortion through the material. "Clear" may be considered to be both transparent and colorless.

As used herein, "travel" or "travel distance" may refer to the maximum distance that a mechanical part may move due to constraints imposed by the system. As a non-limiting example, the travel distance of a component may be constrained by interference with one or more other components such as mechanical stops.

As used in this disclosure, "vertical" may refer to a direction that is parallel to the local force of gravity. Unless specifically noted in this disclosure, the vertical direction is always perpendicular to horizontal.

As used in this disclosure, a "worm drive" may refer to a mechanical arrangement where a rotating cylinder further comprising an exterior screw thread is used rotate a gear or to move a plate formed with an interior screw thread in a linear fashion along a direction that is aligned with the center axis of the rotating cylinder.

With respect to the above description, it is to be realized that the optimum dimensional relationship for the various components of the invention described above and in FIGS. 1 through 7, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A semi-truck side-view mirror with integral camera comprising:
 a side view mirror, a camera, a rotation mechanism, a mounting arm, and a display screen;
 wherein the semi-truck side-view mirror with integral camera is adapted to provide a driver with visibility of a tail end of a trailer during a backing turn;
 wherein the camera within the side view mirror presents an image on the display screen showing the tail end of the trailer;
 wherein during the backing turn, the rotation mechanism rotates the side view mirror about a vertically-oriented axis of rotation to keep the tail end of the trailer within the field of view of the camera;
 wherein the side view mirror comprises one or more mirror segments;
 wherein the one or more mirror segments comprise a first mirror segment and a second mirror segment;
 wherein the first mirror segment and the second mirror segment are mounted within a side view mirror housing;
 wherein the second mirror segment is adjacent to the first mirror segment;
 wherein the side view mirror housing is a triangular housing when viewed from above with the one or more mirror segments on a first surface of the triangular housing and the display screen mounted on a second surface of the triangular housing where the second surface is located between the center of the side view mirror and the front of the truck.

2. The semi-truck side-view mirror with integral camera according to claim 1
 wherein the camera is mounted within the side view mirror behind the one or more mirror segments;
 wherein the camera has a field of view that is directed towards the tail end of the trailer through the one or more mirror segments.

3. The semi-truck side-view mirror with integral camera according to claim 2
 wherein the one or more mirror segments comprise a camera portal that provides an optical pathway through the one or more mirror segments for the camera to view the trailer.

4. The semi-truck side-view mirror with integral camera according to claim 3
 wherein the camera portal is a camera aperture;
 wherein the camera aperture is an aperture in the one or more mirror segments that is devoid of glass and passes from the front surface of the one or more mirror segments to the rear surface of the one or more mirror segments;
 wherein the camera views the trailer through the camera aperture.

5. The semi-truck side-view mirror with integral camera according to claim 3
 wherein the camera portal is an unsilvered area of the one or more mirror segments;
 wherein the one or more mirror segments provide clear glass in front of the camera at the camera portal;
 wherein with the metal that causes the one or more mirror segments to reflect light missing at the camera portal, the camera views the trailer through the camera portal.

6. The semi-truck side-view mirror with integral camera according to claim 3
 wherein the camera portal is a half-silvered area;
 wherein the one or more mirror segments appear to be reflective over the entirety of the one or more mirror segments, including at the camera portal, from the front side of the one or more mirror segments, however the one or more mirror segments appear to be transparent from the rear side of the one or more mirror segments at least at the camera portal.

7. The semi-truck side-view mirror with integral camera according to claim 3
 wherein the first mirror segment and the second mirror segment comprise different degrees of magnification.

8. The semi-truck side-view mirror with integral camera according to claim 7
wherein the first mirror segment is planar and provides unity magnification;
wherein the second mirror segment is convex and provides a wider field of view compared to the first mirror segment.

9. The semi-truck side-view mirror with integral camera according to claim 3
wherein the camera is an optical instrument that captures the image of a scene in front of the camera as binary values stored in memory within the camera;
wherein an image sensor within the camera converts the image into the binary values;
wherein one or more of the images are communicated to the display screen as electrical signals such that the display screen shows a representation of objects that the camera is pointed towards.

10. The semi-truck side-view mirror with integral camera according to claim 9
wherein the camera is directed towards the trailer such that a lens projects the image of the trailer into the camera;
wherein the camera is housed within a camera body that is coupled to the side view mirror housing such that the camera is positioned behind the one or more mirror segments and the lens is aligned with the camera portal.

11. The semi-truck side-view mirror with integral camera according to claim 10
wherein the rotation mechanism pivotably couples the side view mirror to the mounting arm;
wherein the rotation mechanism receives a steering signal from a steering sensor within a truck reporting the direction and magnitude that the truck is being steered;
wherein responsive to the steering signal, the rotation mechanism rotates the side view mirror such that the camera remains pointed at the trailer with the tail end of the trailer included in the image shown on the display screen.

12. The semi-truck side-view mirror with integral camera according to claim 11
wherein the rotation mechanism comprises a motor and a worm drive;
wherein the motor converts electrical energy into mechanical energy;
wherein the motor causes rotational motion of the worm drive when the electrical energy is applied to the motor;
wherein the electrical energy applied to the motor is controlled by the steering sensor;
wherein the motor is energized by electrical energy having a first polarity to rotate the side view mirror away from the truck;
wherein the motor is energized by electrical energy having a second polarity to rotate the side view mirror towards the truck;
wherein the motor is coupled to the inside of the side view mirror housing.

13. The semi-truck side-view mirror with integral camera according to claim 12
wherein the worm drive comprises a worm screw and a worm gear;
wherein the worm screw is a threaded cylinder that is coupled to the motor;
wherein the worm gear is a toothed wheel that is coupled to the mounting arm;
wherein the teeth on the worm gear complements the threads on the worm screw such that the worm gear meshes with the worm screw;
wherein rotation of the worm screw rotates the worm gear relative to the worm screw;
wherein rotation of the worm screw causes the worm screw to travel along the worm gear because the worm gear is immovably coupled to the mounting arm;
wherein the worm screw pushes the side view mirror housing and causes rotation of the side view mirror.

14. The semi-truck side-view mirror with integral camera according to claim 13
wherein the display screen is mounted within a cab of the truck.

15. The semi-truck side-view mirror with integral camera according to claim 14
wherein the display screen is mounted on a dashboard.

16. The semi-truck side-view mirror with integral camera according to claim 13
wherein the display screen is mounted on the side view mirror.

17. The semi-truck side-view mirror with integral camera according to claim 16
wherein the display screen is mounted on a side of the side view mirror between the side view mirror and the truck in a position that is not coplanar with the one or more mirror segments and is angled towards the front of the truck.

18. The semi-truck side-view mirror with integral camera according to claim 13
wherein the side view mirror, the camera, the rotation mechanism, and the mounting arm are coupled to a right side of the truck.

* * * * *